(12) United States Patent
Marquette et al.

(10) Patent No.: US 9,058,817 B1
(45) Date of Patent: Jun. 16, 2015

(54) METHOD AND SYSTEMS FOR SIMPLIFYING COPYING AND PASTING TRANSCRIPTIONS GENERATED FROM A DICTATION BASED SPEECH-TO-TEXT SYSTEM

(71) Applicant: NVOQ INCORPORATED, Boulder, CO (US)

(72) Inventors: Brian Marquette, Longmont, CO (US); Charles Corfield, Boulder, CO (US); Todd Espy, Cumming, GA (US)

(73) Assignee: nVoq Incorporated, Boulder, CO (US)

( * ) Notice: Subject to any disclaimer, the term of this patent is extended or adjusted under 35 U.S.C. 154(b) by 0 days.

(21) Appl. No.: 14/103,716

(22) Filed: Dec. 11, 2013

Related U.S. Application Data

(63) Continuation of application No. 12/426,835, filed on Apr. 20, 2009, now Pat. No. 8,639,505.

(60) Provisional application No. 61/047,249, filed on Apr. 23, 2008.

(51) Int. Cl.
*G10L 15/26* (2006.01)
*G10L 21/00* (2013.01)
*G06F 17/21* (2006.01)

(52) U.S. Cl.
CPC ..................... *G10L 15/26* (2013.01)

(58) Field of Classification Search
None
See application file for complete search history.

(56) References Cited

U.S. PATENT DOCUMENTS

| | | | |
|---|---|---|---|
| 5,761,641 A * | 6/1998 | Rozak et al. | 704/275 |
| 5,870,454 A | 2/1999 | Dahlen | |
| 5,960,399 A | 9/1999 | Barclay et al. | |
| 6,100,882 A | 8/2000 | Sharman et al. | |
| 6,173,259 B1 | 1/2001 | Bijl et al. | |
| 6,366,882 B1 | 4/2002 | Bijl et al. | |
| 6,477,493 B1 | 11/2002 | Brooks et al. | |
| 6,507,816 B2 | 1/2003 | Ortega | |
| 6,510,414 B1 * | 1/2003 | Chaves | 704/270 |
| 6,622,121 B1 | 9/2003 | Crepy et al. | |
| 6,704,709 B1 | 3/2004 | Kahn et al. | |
| 6,766,294 B2 | 7/2004 | MacGinite et al. | |
| 6,820,055 B2 | 11/2004 | Saindon et al. | |
| 7,006,967 B1 * | 2/2006 | Kahn et al. | 704/235 |
| 7,035,604 B2 | 4/2006 | Sander et al. | |
| 7,047,192 B2 | 5/2006 | Poirier | |
| 7,103,542 B2 | 9/2006 | Doyle | |
| 7,120,700 B2 | 10/2006 | Macleod Beck et al. | |

(Continued)

FOREIGN PATENT DOCUMENTS

| | | |
|---|---|---|
| WO | WO 2005/104092 | 11/2005 |
| WO | WO2005104092 A2 | 11/2005 |

OTHER PUBLICATIONS

Extended European Search Report for 09735463.3 dated Sep. 26, 2012. 6 pages.

(Continued)

*Primary Examiner* — Brian Albertalli
(74) *Attorney, Agent, or Firm* — Perkins Coie LLP

(57) ABSTRACT

A computer-implemented method for simplifying the pasting of textual transcriptions from a transcription engine into an application is described. An audio file is sent to a transcription engine. A textual transcription file of the audio file is received from the transcription engine. The textual transcription file is automatically loaded into a copy buffer. The textual transcription file is pasted from the copy buffer into an application.

15 Claims, 4 Drawing Sheets

(56) References Cited

U.S. PATENT DOCUMENTS

| | | | |
|---|---|---|---|
| 7,130,401 B2 | 10/2006 | Rampey et al. | |
| 7,136,462 B2 | 11/2006 | Pelaez et al. | |
| 7,181,413 B2 | 2/2007 | Hadden et al. | |
| 7,184,539 B2 | 2/2007 | Colson et al. | |
| 7,225,126 B2 | 5/2007 | Hirschberg et al. | |
| 7,257,531 B2 | 8/2007 | Holub | |
| 7,260,534 B2 | 8/2007 | Gandhi et al. | |
| 7,292,975 B2 | 11/2007 | Lovance et al. | |
| 7,318,031 B2* | 1/2008 | Bantz et al. | 704/251 |
| 7,324,944 B2 | 1/2008 | Hansen et al. | |
| 7,503,012 B2* | 3/2009 | Chen et al. | 715/769 |
| 7,743,340 B2* | 6/2010 | Horvitz et al. | 715/808 |
| 2002/0169606 A1 | 11/2002 | Bantz et al. | |
| 2004/0064317 A1 | 4/2004 | Othmer et al. | |
| 2004/0218751 A1 | 11/2004 | Colson et al. | |
| 2005/0066335 A1 | 3/2005 | Aarts | |
| 2005/0197836 A1 | 9/2005 | Cohen et al. | |
| 2006/0095259 A1 | 5/2006 | Bahl et al. | |
| 2006/0167686 A1 | 7/2006 | Kahn | |
| 2006/0190250 A1 | 8/2006 | Saindon et al. | |
| 2006/0282265 A1 | 12/2006 | Grobman et al. | |
| 2007/0050238 A1 | 3/2007 | Carr et al. | |
| 2007/0156400 A1 | 7/2007 | Wheeler | |
| 2007/0198250 A1* | 8/2007 | Mardini | 704/9 |
| 2008/0052076 A1 | 2/2008 | Metz | |
| 2008/0082932 A1 | 4/2008 | Beumer | |
| 2009/0013255 A1* | 1/2009 | Yuschik et al. | 715/728 |
| 2009/0112572 A1* | 4/2009 | Thorn | 704/3 |

OTHER PUBLICATIONS

European Search Report for 07763139.8 dated Dec. 18, 2009.

Notification of Transmittal of the International Search Report and the Written Opinion of the International Searching Authority, or the Declaration for PCT/US09/41550 mailed Dec. 7, 2009.

Notification of Transmittal of the International Search Report and the Written Opinion of the International Searching Authority, or the Declaration for PCT/US09/41546 mailed Dec. 7, 2009.

* cited by examiner

METHOD AND SYSTEMS FOR SIMPLIFYING COPYING AND PASTING TRANSCRIPTIONS GENERATED FROM A DICTATION BASED SPEECH-TO-TEXT SYSTEM

CLAIM OF PRIORITY UNDER 35 U.S.C. §119

This application claims the benefit under 35 U.S.C. 119(e) of U.S. Provisional Application No. 61/047,249 titled METHOD AND SYSTEMS FOR SIMPLIFYING COPYING AND PASTING TRANSCRIPTIONS GENERATED FROM A DICTATION BASED SPEECH-TO-TEXT SYSTEM filed on 23 Apr. 2008.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to speech-to-text conversion for dictation systems, and more specifically, to methods and systems to simplify copying and pasting transcriptions generated from a dictation based speech-to-text system.

2. Background

Many companies provide customers the ability to contact the company using a call center to field customer calls, correct customer problems, or direct the customer to the appropriate resource to solve the problems that initiated the call. Conventionally, a call center operates by a call being directed from a customer to an available agent or representative. Along with the telephone call, the agent or representative typically has a customer relation management screen that the company has authorized or specifically designed to facilitate assisting the customer.

Referring now to FIG. 1, a conceptual representation of the systems within a call center 100 is shown. The call center 100 includes both voice technologies, which lie on the signaling and audio path and terminate at the agent's phone (or headset) and IP-based technologies that support the CRM (also known as customer relationship management) application, whose graphical user interface (GUI) runs on the agent's processor, such as, for example, a personal computer or the like. To support this, the call center 100 includes ACD (also known as automatic call distribution) 102 having an audio connection 104 to an agent phone 106. ACD 102 also has an audio connection 108 to IVR (also known as interactive voice response) 110. Audio connection 104 and 108 may be overlapping, completely separate, or a combination thereof. IVR 110 has a data connection 112 to CTI (also known as computer telephony interface) 114. CTI 114 typically provides call control 116 to ACD 102 and data and application control 118 to an agent's computer 120. Thus, when a customer uses a telephone 122 or the like to call the call center over a conventional network 124, such as, the PSTN (also known as public switched telephone network) shown, the audio, data, and applications necessary for the agent to assist the caller are provided.

While FIG. 1 identifies a customer calling over a conventional PSTN as shown, calls from customers may originate from a computer or cable based VoIP (also known as voice over internet protocol) network instead. The network 124 may be a conventional PSTN network as shown, such as, for example, when the customer is using a conventional land line or cellular telephone. Alternatively, network 124 may be a computing network, such as, for example, a LAN, a WAN, a WLAN, a WWAN, a WiFi, the internet, an Ethernet, or other private area network. When network 124 is a computing network, the call from the customer may originate from a VoIP enabled device, such as, for example, a computer telephone. Notice, VoIP telephones may be transferred to conventional PSTN networks using conventional technology. Moreover, conventional land lines, for example, may be connected to a computer network using a soft phone or media gateway.

Once the call between the customer service representative is established and the CRM application is running on the representative's user interface, the customer service representative would solicit input from the customer. Such input may consist of information such as customer name, address, nature of the problem, and the like. Traditionally, the representative inputs this information by typing the information into the respective fields for input. At the end of the call, often the customer service representative would fill out a field in the CRM application generically known as notes or end of call notes. This field would typically be typed by the representative to acknowledge information such as, for example, the disposition of the customer complaint or the like.

While CRM application and information generation is a useful tool, many customer service representatives are not efficient typists. Moreover, even for efficient typists, it has been recognized that most people speak significantly faster than they type. Thus, recently there has been a movement to use dictation, such as, for example, Dragon Naturally Speaking available from Nuance Communication, Inc., to dictate instead of type information into the various fields.

Using dictation as a tool to add information to fields in a CRM application, however, to date have been cumbersome and unwieldy. Thus, against this background, it would be desirous to provide a simplified method and system for copying and pasting transcription from a dictation based speech-to-text system.

SUMMARY

A computer-implemented method for simplifying the pasting of textual transcriptions from a transcription engine into an application is described. An audio file is sent to a transcription engine. A textual transcription file of the audio file is received from the transcription engine. The textual transcription file is automatically loaded into a copy buffer. The textual transcription file is pasted from the copy buffer into an application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

In one embodiment, the copy buffer may be a clipboard copy buffer. The transcription engine may be a dictation based speech-to-text system. The textual transcription file may be pasted from the copy buffer into a specific data field of the application.

In one embodiment, the textual transcription file may be automatically loaded into the copy buffer without receiving input commands from a user. A notification may be provided to the user when the textual transcription file has been automatically loaded into the copy buffer. The notification may be a visual indicator. In one embodiment, the notification may be an audio indicator.

In one configuration, the textual transcription file may be automatically loaded into the copy buffer without a user accessing a document creation application that comprises the textual transcription file. In one embodiment, the method described above may be implemented by a computer system operating in a call center environment.

A computer system configured to simplify the pasting of textual transcriptions from a transcription engine into an application also is described. The computer system includes a processor and memory in electronic communication with the processor. The processor may be configured to send an audio file to a transcription engine and receive a textual transcription file of the audio file from the transcription engine. The processor also may be configured to automatically load the textual transcription file into a copy buffer and paste the textual transcription file from the copy buffer into an application.

A computer-program product for simplifying the pasting of textual transcriptions from a transcription engine into an application also is described. The computer-program product may include a computer-readable medium having instructions thereon. The instructions may include code programmed to send an audio file to a transcription engine and code programmed to receive a textual transcription file of the audio file from the transcription engine. The instructions also may include code programmed to automatically load the textual transcription file into a copy buffer and code programmed to paste the textual transcription file from the copy buffer into an application.

DETAILED DESCRIPTION

The technology of the present application will now be explained with reference to a customer call center application. The technology, in general, is described as directing the audio from a user to a remote server that converts the audio to text and returns a transcription of the text. Moreover, the technology of the present application is explained using a conventional operating system, such as, for example, WINDOWS®, that is available from Microsoft Corporation. One of ordinary skill in the art on reading the disclosure will now recognize that the technology of the present application will be useful in other environments and other operating systems. Other operating systems include, for example, Linux, Mac OS X, Solaris, to name but a few conventional operating systems. Moreover, while described as a remote server to provide the transcription, the transcription may be loaded directly to the user processor. Additionally, the technology of the present application may be used in environments other than call centers to provide simplified copying and pasting of transcription results. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As explained above, dictation based speech-to-text conversion software has existed for some time. The dictation may be performed on a local processor such that real-time or near real-time transcription of the dictation may be provided to the user. Alternatively, the dictation may be batch loaded to a central processor or server where the transcription is returned at a later date. Either dictation system may use a free form, grammatical speech recognition engine or a pattern match speech recognition.

Figure 1:
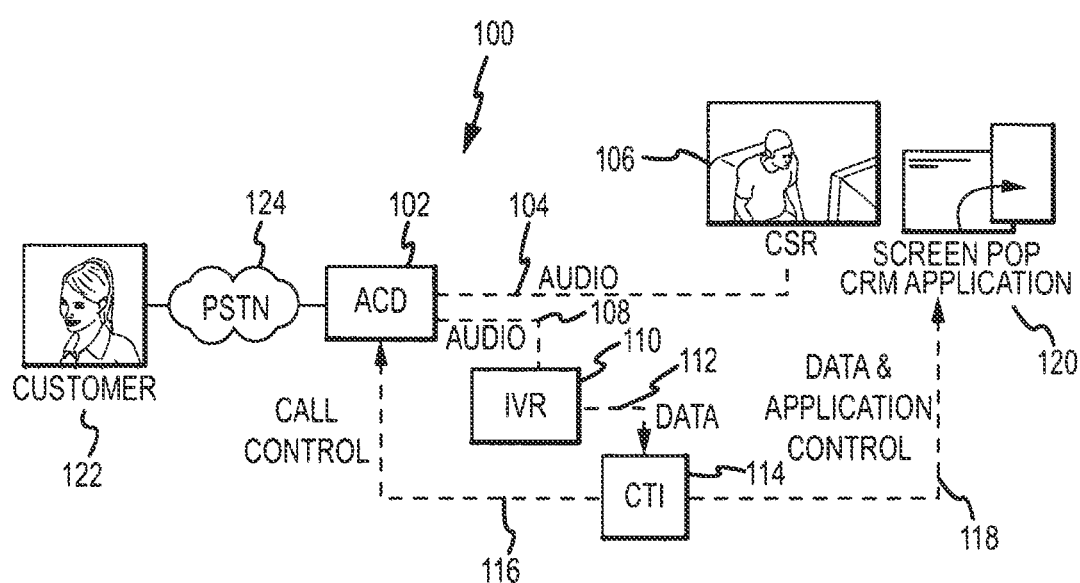
FIG. 1 is a functional block diagram of a call center system.
Figure 2:
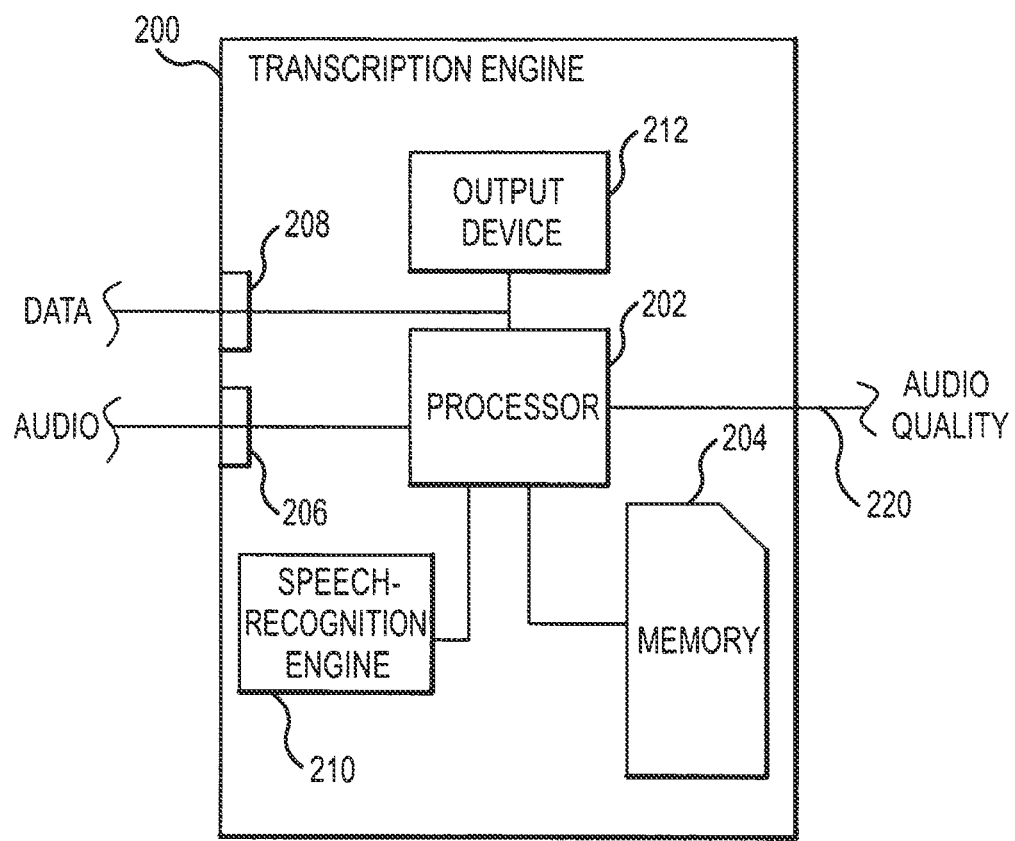
FIG. 2 is a functional block diagram of a transcription engine constructed in accordance with an exemplary embodiment of the technology of the present application.

Referring first to FIG. 2, a functional diagram of a transcription engine 200 for the technology of the present application is provided. Transcription engine 200 includes a processor 202, such as, for example, a microprocessor, a central processing unit, a desktop computer, a server, a laptop computer, a handheld computer or the like. Processor 202 controls the major functions of the transcription engine 200 including the functional operations described herein below. Processor 202 also processes the various inputs and/or data that may be required to operate transcription engine 200. A memory 204 is interconnected with processor 202. Memory 204 may be remotely located or co-located with processor 202. The memory 204 also may store data necessary or convenient for operation of the transcription engine 200 as will be explained herein. Transcription engine 200 further includes an audio reception interface 206 or port that can receive audio information from a user, such as, for example, a customer service representative. Transcription engine 200 also includes a data interface 208 or port to receive or transmit data from and to the user.

Interconnected to processor 202 is a speech-to-text engine 210 that converts the audio signal received from the user into a text file that can be returned to the user or further processed as part of the evaluation. Speech-to-text engine 210 is generally understood in the art and will not be further explained herein. Engine 210 may be provided remotely from, integrated with, or co-located with processor 202.

Transcription engine 200 further includes an output device 212, such as a display, a printer, an email generator, or the like, as is conventional in the art.

As can be appreciated, an audio signal is received from a user at port 206 of transcription engine 200. The audio signal may be streamed or batch loaded to the transcription engine. Processor 202 may fetch a user profile from memory 204 to facilitate transcription. The user profile is generally understood in the art to contain information regarding the user to train the recognition engine to the particular user. Such training may account for user specific speech. Speech-recognition engine 210 would process the audio using, for example, the user profile to convert the audio signal into text. Processor 202 would cause the transcription engine to output the text file via data port 208 to the user.

Figure 3:
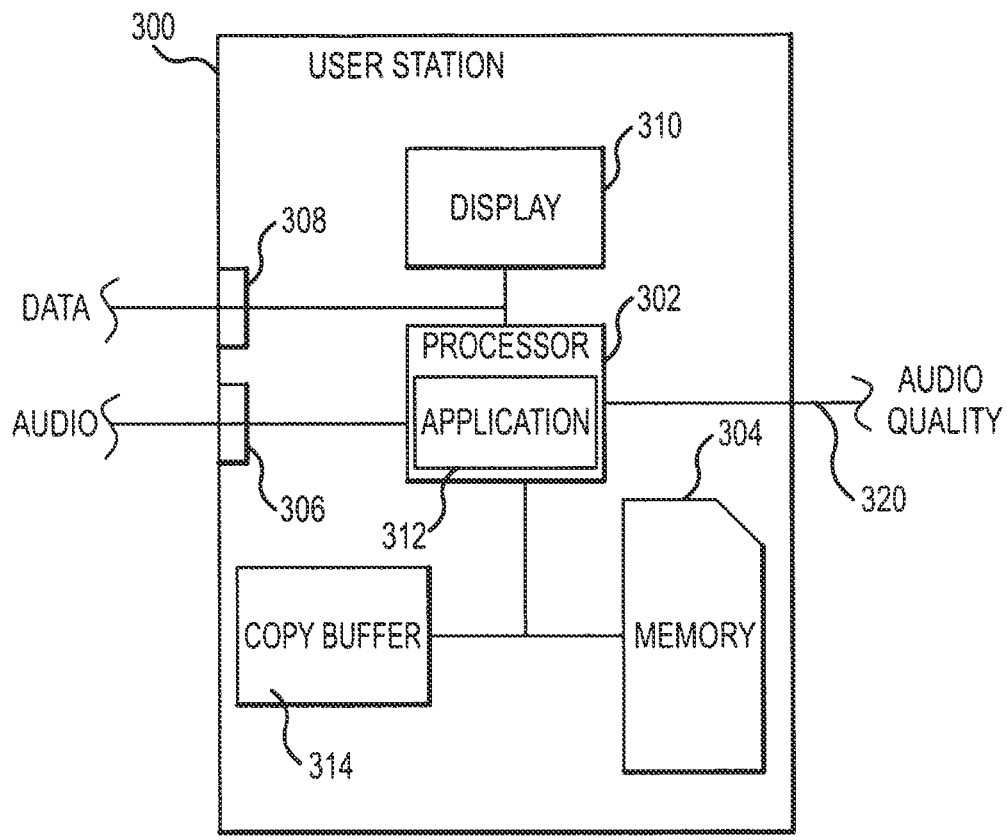
FIG. 3 is a functional block diagram of a user station constructed in accordance with an exemplary embodiment of the technology of the present application.

Referring now to FIG. 3, a user station 300 is provided. User station 300 includes a processor 302, such as, for example, a microprocessor, a central processing unit, a desktop computer, a server, a laptop computer, a handheld computer or the like. Processor 302 controls the major functions of the user station 300 including the functional operations described herein below. Processor 302 also processes the various inputs and/or data that may be required to operate user station 300. A memory 304 is interconnected with processor 302. Memory 304 may be remotely located or co-located with processor 302. The memory 304 also may store data necessary or convenient for operation of the user station 300 as will be explained herein. User station 300 may include an audio port 306 to transmit an audio file to the transcription engine 200 and a data port 208 to send and receive data between transcription engine 200 and user station 300. User station 300 may include a display 310 to display a customer relationship management database screen to the customer service agent as is generally known in the art.

In operation, user station 300 would record and transmit (batch or stream) an audio file using a conventional method via audio port 306 for transcription by transcription engine 200. Transcription engine 200 would return, via data port 208, a text file of the transcription. An application 312 receives the text file and inputs the text file directly to a copy buffer 314 associated with the operating system of user station 300. For example, the text results are received by the application 312 and application 312 inputs the text directly to the "clipboard" copy buffer for a Windows based computing system. The returned text may be pasted directly to a field in the display 310, such as an end of call notes field, using just the paste keystrokes or commands without first copying the returned text file. In the example of a Windows based computing system, the user would simply hit ctrl+v to paste the text. The user may be notified that the results are available for copying by a visual indicator in the display 310, such as, for example, a popup balloon or bubble, or an audio indicator such as a tone (similar to, for example, how many email or text message systems indicate new messages are available). This decreases the overall time for copying and pasting conventional text returned from a dictation system by eliminating the need to switch to the notepad or document creation application, such as Microsoft Word® available from Microsoft, Inc., eliminates the need to manually copy the information from the notepad or document to the clipboard, and eliminates the need to switch back to the application to which the transcription is to be pasted. Rather, the user, without leaving the application, simply selects the paste command and the text is pasted directly to the application.

Figure 4:
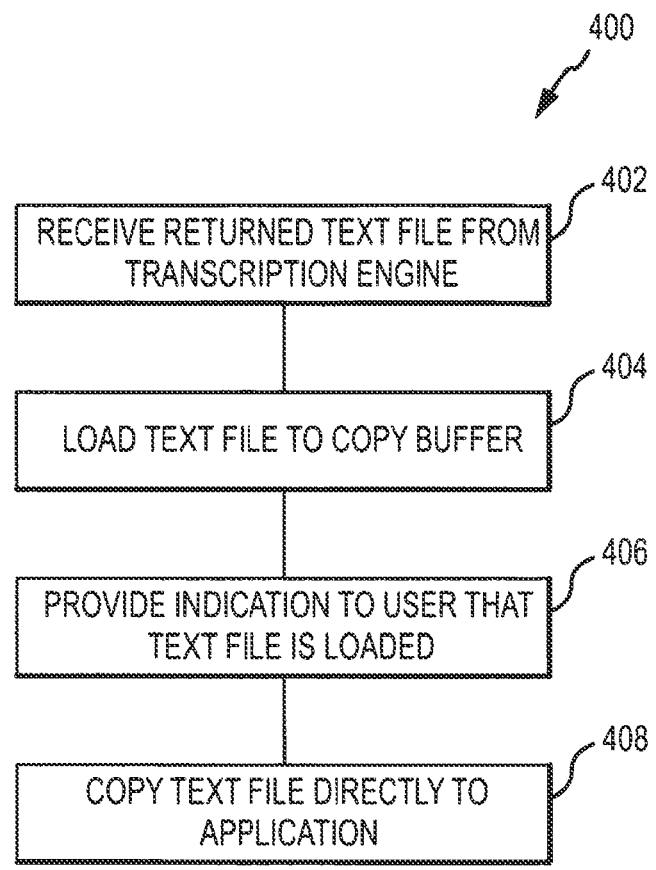
FIG. 4 is an exemplary flowchart illustrating operational steps associated with the technology of the present application.

FIG. 4 provides an exemplary flowchart 400 illustrating possible operating steps to perform the technology of the present application. First, a textual transcription file is returned to the user station 300 from the transcription engine 200, step 402. Next, the text file is loaded directly to the copy buffer associated with the operating system, step 404. For example, the text file is loaded directly to the clipboard for a MS Windows machine. Alternatively, the text file may be received by a running application, such as application 312, that inputs the text to the copy buffer. An indicator that the text file is loaded to the copy buffer is provided to the user, step 406. The user, without leaving the currently running application, downloads the text file from the copy buffer directly to the applicable field in the running application, step 408. The system is ready for the next transcription. Loading the text file to the copy buffer instead of trying to directly load the text file to the application makes the system application independent and the present system may interface with virtually any application capable of running on the operating system platform with limited or no modifications as long as the application accepts information from the copy buffer.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method for simplifying the pasting of textual transcriptions from a transcription engine into an application, comprising:

sending an audio file to a transcription engine from a workstation of an agent;

receiving a textual transcription file of the audio file from the transcription engine at the workstation of the agent;

automatically loading the textual transcription file directly into a copy buffer without invoking a word processing application at the workstation such that the textual transcription is configured to be pasted to a data field of an application; and pasting the textual transcription file from the copy buffer into the data field of the application.

2. The method of claim 1, wherein the copy buffer is a clipboard copy buffer.

3. The method of claim 1, wherein the transcription engine is a dictation based speech-to-text system.

4. The method of claim 1, further comprising automatically loading the textual transcription file into the copy buffer without receiving input commands from a user.

5. The method of claim 4, further comprising providing a notification to the user when the textual transcription file has been automatically loaded into the copy buffer.

6. The method of claim 5, wherein the notification is a visual indicator.

7. The method of claim 5, wherein the notification is an audio indicator.

8. The method of claim 1, wherein the method is implemented by a computer system operating in a call center environment.

9. A computer system configured to simplify the pasting of textual transcriptions from a transcription engine into an application, comprising:
    a processor;
    memory in electronic communication with the processor, the memory comprising at least a copy buffer;
    the processor configured to:
        send an audio file to a transcription engine;
        receive a textual transcription file of the audio file from the transcription engine;
        automatically load, without using a file creation application, the textual transcription file into the copy buffer; and
        paste the textual transcription file from the copy buffer into an application with a command input to the processor.

10. The computer system of claim 9, wherein the copy buffer is a clipboard copy buffer.

11. The computer system of claim 9, wherein the transcription engine is a dictation based speech-to-text system.

12. The computer system of claim 9, wherein the processor is further configured to provide a notification to the user when the textual transcription file has been automatically loaded into the copy buffer.

13. The computer system of claim 12, wherein the notification is a visual indicator.

14. The computer system of claim 9, wherein the computer system operates in a call center environment.

15. A non-transitory computer-program product for simplifying the pasting of textual transcriptions from a transcription engine into an application, the computer-program product comprising a computer-readable medium having instructions thereon, the instructions comprising:
    code programmed to send an audio file to a transcription engine;
    code programmed to receive a textual transcription file of the audio file from the transcription engine;
    code programmed to automatically load the textual transcription file into a copy buffer without accessing a word processing application such that the textual transcription is configured to be pasted to a data field of an application; and
    code programmed to paste the textual transcription file from the copy buffer into an application.

* * * * *